United States Patent [19]

Uozumi et al.

[11] 4,234,065
[45] Nov. 18, 1980

[54] MEANS FOR FEEDING ELECTRIC POWER TO TRACK GUIDED VEHICLES

[75] Inventors: Yukio Uozumi; Masaharu Yagi, both of Kobe, Japan

[73] Assignee: Kawasaki Jukogyo Kabushiki Kaisha, Kobe, Japan

[21] Appl. No.: 41,105

[22] Filed: May 21, 1979

[30] Foreign Application Priority Data

May 22, 1978 [JP] Japan .................................. 53-61193

[51] Int. Cl.³ ............................................. B60M 1/34
[52] U.S. Cl. .................................... 191/29 R; 191/49
[58] Field of Search .................... 191/23 R, 29 R, 32, 191/45 R, 49, 59.1, 60.2

[56] References Cited

U.S. PATENT DOCUMENTS

| 3,733,446 | 5/1973 | Colovas | 191/49 |
| 3,786,762 | 1/1974 | Corkum | 191/49 X |

FOREIGN PATENT DOCUMENTS

| 506876 | 8/1930 | Fed. Rep. of Germany | 191/49 |
| 2419711 | 11/1975 | Fed. Rep. of Germany | 191/29 R |
| 1522602 | 8/1978 | United Kingdom | 191/49 |

Primary Examiner—Richard A. Schacher
Attorney, Agent, or Firm—Fleit & Jacobson

[57] ABSTRACT

Three phase power feeding device for a track guided vehicle including three power feeding lines provided along one side of the track, the center one of the feed lines being located closer to the track than the other two of the lines. The vehicle is provided with a collector device comprised of three collector shoes adapted to be engaged respectively with the power feed lines. The collector shoes are associated with insulative shoes which are longer than the collector shoes so that the insulative shoes are maintained in contact with the respective ones of the power feed lines even when the collector shoes are detached from the feed lines due to rolling movement of the vehicle.

6 Claims, 6 Drawing Figures

MEANS FOR FEEDING ELECTRIC POWER TO TRACK GUIDED VEHICLES

The present invention relates to guided vehicles comprising running wheels adapted to run along running tracks and guide wheels adapted to run along guide rails provided at the opposite sides of the running tracks. More specifically, the present invention pertains to means for feeding electric power to such guided vehicles.

In order to feed an electric car with three phase electric power, it is required to provide a ground facility having at least three power feeding lines and the vehicle must be provided with power collecting devices which are adapted to cooperate with the power feed lines. However, in this arrangement, problems have been encountered in that the collector shoes in the power collecting devices are often detached from the power feed lines as the vehicle is rolled during operation and it may sometimes be possible that one collector shoe is detached from the cooperating feed line and brought into contact with another feed line. The problem may be eliminated by increasing the lengths of the collector shoes and also increasing the spacings among the feed lines. However, such solution is not recommendable because a large space is required for setting up the power feed system.

Japanese patent disclosure 50-117,110 which has been laid open to public inspection on Sept. 12, 1975 teaches a solution for such problems. According to the proposal, the intermediate one of the three power feed lines is located closer to the vehicle than the other feed lines and the vehicle is provided with collector shoes which are of sufficient lengths for maintaining contacts with the feed lines even when the vehicle is rolled. Such shoes are mounted through independent spring mechanisms on the vehicle with a longitudinally staggered or offset relationship from each other. Further, the shoes are inclined with respect to each other. The arrangement is therefore effective to eliminate any problem of each shoe of being brought into contact with power feed lines with which the specific collector shoe is not supported to cooperate. The proposal is also believed as being effective in providing a compact arrangement of the power feed system. However, there is still a problem because satisfactory measures are not provided for ensuring that the collector shoes are smoothly returned into contact with the cooperating feed lines after the shoes have been detached from the feed lines due to a large rolling movement of the vehicle.

It should further be noted that, in the guided vehicle of the aforementioned type, the running and guide wheels are usually rubber tired and it is therefore usually required for protecting passengers from possible electric shock to provide a grounding system for removing any electric charges in the vehicle body which may be caused by a static charge and/or leakage from the electric system in the vehicle.

It is therefore an object of the present invention to provide a multiple line power feeding system for guided vehicles which is relatively compact but does not have any problem of mutual contact among the collector shoes even when there is a large rolling movement of the vehicle.

Another object of the present invention is to provide a multiple line power feeding system which can substantially decrease such problem that the collector shoes are detached from the cooperating feed lines and brought into contact with other feed lines with which they are not supposed to cooperate.

A further object of the present invention is to provide a multiple line power feed system in which the collector shoes can be smoothly returned into contact with the cooperating feed lines after the shoes have been detached from the feed lines due to an abnormally large rolling movement of the vehicle.

Still further object of the present invention is to provide a simple but reliable vehicle body grounding system.

According to the present invention, the above and other objects can be accomplished by multiple line electric power feeding means for a guided vehicle having running wheel means adapted to run along running track means and guide wheel means adapted to run along a pair of guide rail means provided at the opposite sides of the running track means, said power feeding means including three power feed lines located above one of said guide rail means for receiving supply of electric power, said power feed lines being vertically spaced one from the other with an intermediate one being closer to the running track means than the others, collector shoes provided on the vehicle for respectively cooperating with the power feed lines, at least the collector shoe cooperating with the intermediate feed line being offset with respect to the other collector shoes in longitudinal direction of the vehicle, said collector shoes being located so that they lie in tangential planes of an imaginary cylinder and being of such lengths that they are maintained in contact with the cooperating power feed lines when there is an ordinary angle of rolling movement of the vehicle, insulative shoes respectively associated with the collector shoes and coplanar with the associated collector shoes, said insulative shoes being of such lengths that they are maintained in contact with the cooperating power feed lines even when there is an abnormally large rolling of the vehicle.

According to the present invention, the insulative shoes functions as guides for the associated collector shoes so that, in case of an abnormally large rolling of the vehicle which may possibly be produced when there is a minor failure in the vehicle suspension system, the collector shoes may be detached from the cooperating power feed lines but as soon as the vehicle is returned to its normal position they can smoothly be returned into contact with the power feed lines.

According to a preferable aspect of the present invention, the guide rail means includes guide surfaces comprised grounded electrically conductive material and the vehicle is provided with grounding shoe means which is adapted to be maintained in contact with the guide surfaces.

The above and other objects and features of the present invention will become apparent from the following descriptions of a preferred embodiment taking reference to the accompanying drawings, in which.

Figure 1:
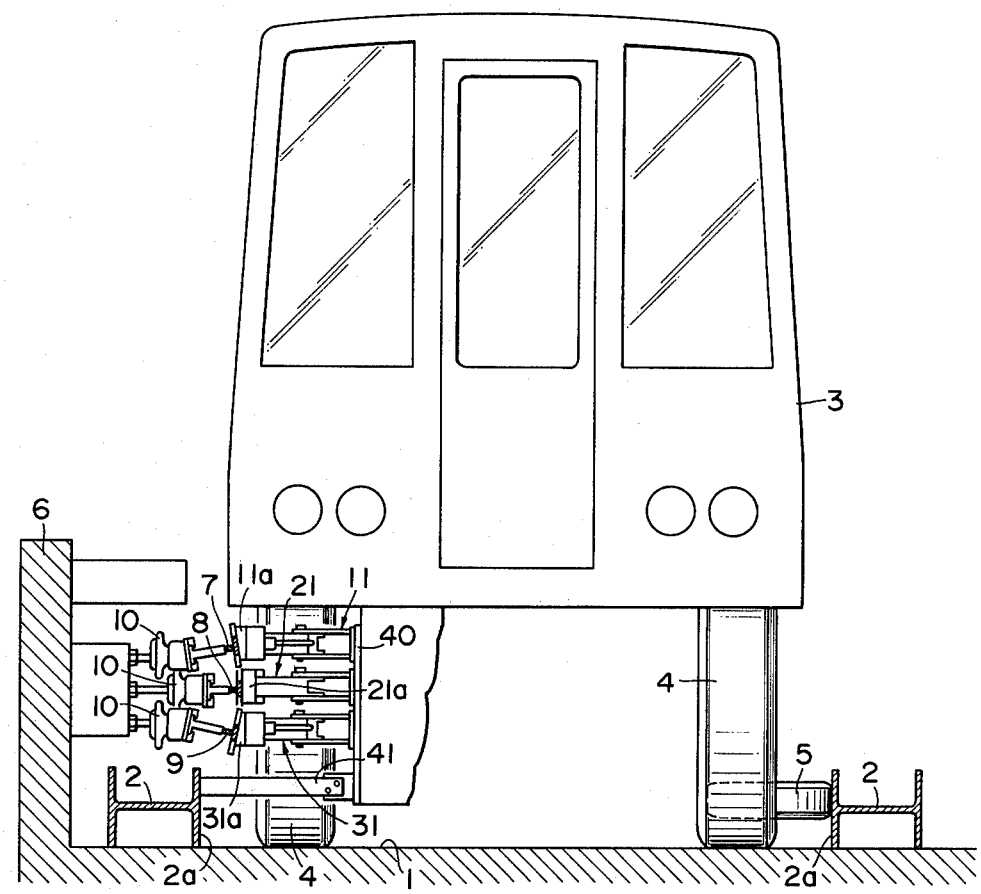
FIG. 1 is a front view of a guided vehicle having the three phase power feeding system in accordance with one embodiment of the present invention.

Referring to the drawings, particularly to FIG. 1, there is shown a guide track system including a running track 1 and a pair of guide rails 2 which have guide surfaces 2a located at the opposite sides of the running track 1. In the illustrated embodiment, the guide rails 2 are made of an electrically conductive metallic material and connected to ground at suitable spacings. The vehicle adapted to run on the track system includes a body 3 which is carried by rubber tired running wheels 4. Guide wheels 5 are also provided in the vehicle and adapted to run along the guide surfaces 2a of the guide rails 2.

Figure 4:
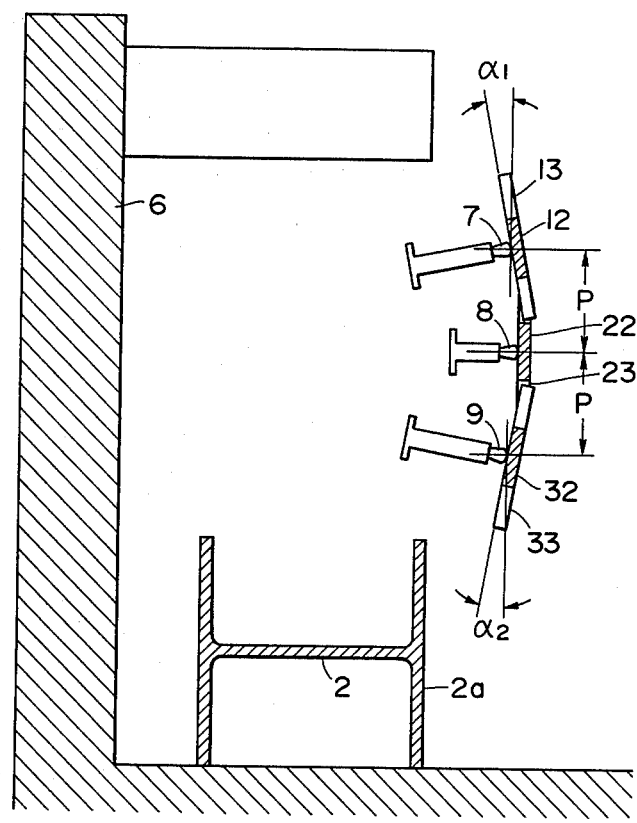
FIG. 4 is a fragmentary sectional view showing the relationship between the power feed lines and the collector shoes in normal operation of the vehicle.

At one side of the track, there is provided a side wall 6 which carries three vertically spaced power feeding lines 7, 8 and 9 through insulators 10. Referring to FIG. 4 as well as FIG. 1, it will be noted that the intermediate feed line 8 is located closer to the center of the track than the other feed lines 7 and 9.

At one side of the vehicle, there are provided three power collecting devices 11, 21 and 31 which are located at levels corresponding to those of the power feed lines 7, 8 and 9. The power collecting devices 11, 21 and 31 include pantographic linkages 14, 24 and 34, respectively, which carry collectors 11a, 21a and 31a at tip ends thereof. The collectors 11a, 21a and 31a have electrically conductive collector shoes 12, 22 and 32, respectively, which are adapted to be engaged with the power feed lines 7, 8 and 9, respectively, and of such lengths that they are maintained in such engagement when the vehicle is subjected to an ordinary rolling. The collectors 11a, 21a and 31a further have electrically insulative shoes 13, 23 and 33 which are substantially coplanar with the shoes 12, 22 and 32, respectively, and also adapted to be engaged with the power feed lines 7, 8 and 9, respectively. The insulative shoes 13, 23 and 33 are of such lengths that they are maintained in engagement with the cooperating power lines even when there is an abnormally large rolling movement of the vehicle. Thus, it will be understood that the insulative shoes 13, 23 and 33 function to guide the collector shoes 12, 22 and 32 when the collector shoes have been detached from the cooperating power feed lines under an abnormally large rolling of the vehicle so that the collector shoes can be returned smoothly into engagement with the power feed lines as soon as the vehicle is returned to its normal position.

Referring to FIG. 4, it will be noted that the shoes 12 and 13 on the uppermost collector 11a are inclined by an angle $\alpha_1$ with respect to a vertical plane and the shoes 32 and 33 on the lowermost collector 31a are inclined by an angle $\alpha_2$ with respect to the vertical plane. The shoes 22 and 23 on the intermediate collector 21a are in a vertical plane. In other words, the shoes are located in tangential planes of an imaginary cylinder. The inclination angles of the shoes are maintained substantially unchanged even when the vehicle is rolled although there may be slight changes equivalent to the rolling angle.

Figure 6:
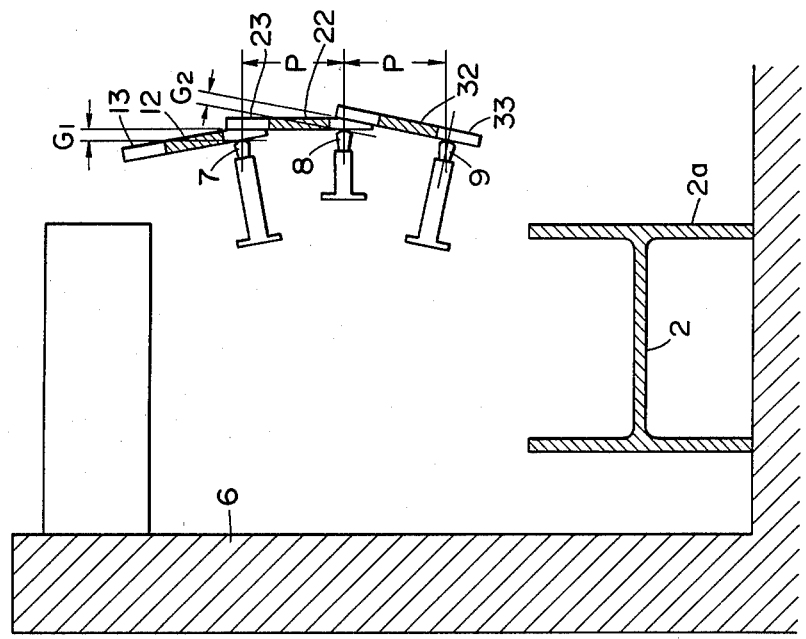
FIG. 6 is a view similar to FIGS. 4 and 5 but showing the positions when the vehicle is moved upwards to an abnormal extent.
Figure 5:
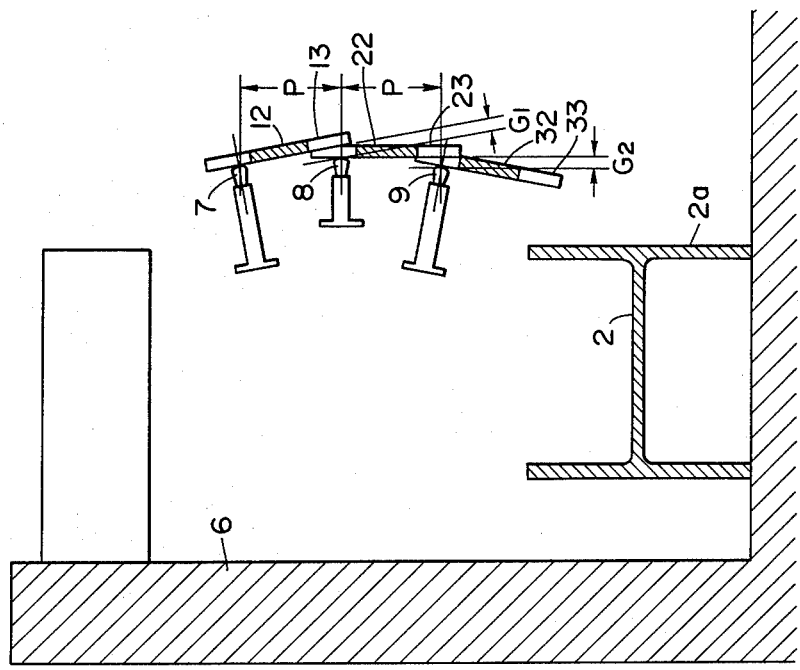
FIG. 5 is a view similar to FIG. 4 but showing the positions when the vehicle is moved downwards to an abnormal extent.

As previously described, the insulative shoes 13, 23 and 33 are longer than the collector shoes 12, 22 and 32 and coplanar therewith. It should therefore be understood that, even when the collector shoes are detached from the cooperating power feed lines due to an abnormally large rolling of the vehicle which may be produced when there is a slight damage in the vehicle suspension system, the insulative shoes are maintained in contact with the power feed lines as shown in FIGS. 5 and 6. Thus, the collectors can maintain their positions to secure clearances G1 and G2 with respect to the other power feed lines.

As far as the collector shoes are concerned, they must be located sufficiently apart from the power feed lines with which they are not adapted to cooperate in order to provide substantial insulative spaces. However, the insulative shoes may be close to the power feed lines of the other phases without producing any problem. It is therefore possible to decrease the clearances G1 and G2 and consequently decrease the angles $\alpha_1$ and $\alpha_2$. Further, it is possible to decrease the vertical spacings P between the feed lines. The angles $\alpha_1$ and $\alpha_2$ and the lengths of the shoes 12, 22, 32, 13, 23 and 33 may be appropriately determined in accordance with the designed value of the rolling of the vehicle.

Figure 2:
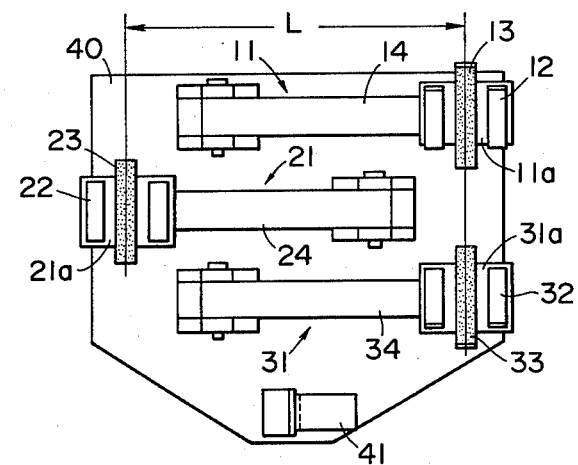
FIG. 2 is a front view of the power collecting and grounding device in accordance with one embodiment of the present invention.
Figure 3:
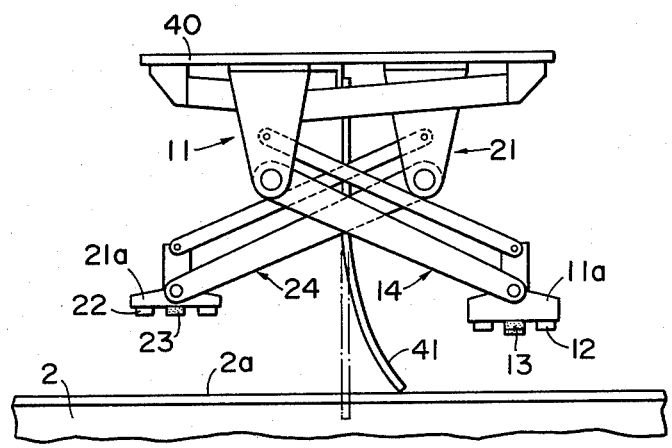
FIG. 3 is a plan view of the device shown in FIG. 2.

Referring to FIGS. 2 and 3, it will be noted that the intermediate collector 21a is offset in longitudinal direction of the vehicle by a distance L with respect to the other collectors 11a and 31a. With this arrangement, it is possible to avoid interference among the collectors. If necessary, the collectors 11a and 31a may be offset in the longitudinal direction from each other. The arrangement is found as effective in providing a compact system.

As shown in FIGS. 1 through 3, the power collecting devices 11, 21 and 31 are mounted on a base plate 40. A grounding shoe 41 is mounted on the base plate 40 and extends towards the guide rail 2. The grounding shoe 41 is normally of a straight configuration as shown by phantom lines in FIG. 3 and so positioned that it is resiliently bent as shown by solid lines when it is engaged with the guide surface 2a of the guide rail 2. The grounding shoe 41 may be made from a strip material which includes, as disclosed in Japanese utility model publication 51-25041, a plurality of steel wires embedded in a rubber base material. Alternatively, use may be made of a wire brush which is in accordance with Japanese patent publication 51-69572. Further, a strip of phosphor bronze may also be used.

The grounding shoe 41 is in positive contact with the guide surface 2a of the guide rail 2 under its own resiliency so that an electric contact is established between the shoe 41 and the guide rail 2. The grounding shoe 41 is in electric contact with the vehicle body 3 so that the vehicle body is grounded when the grounding shoe 41 is engaged with the guide rail 2.

The invention has thus been shown and described with reference to a specific embodiment, however, it should be noted that the invention is in no way limited to the details of the illustrated arrangement but changes and modifications may be made without departing from the scope of the appended claims. For example, the invention can be applied not only to a three phase power feed system but also to a system for applying DC powers of different voltages and to a composite power feed system wherein a single phase AC power and DC power are simultaneously supplied.

We claim:

1. Electric power feeding means for a guided vehicle having running wheel means adapted to run along running track means and guide wheel means adapted to run along a pair of guide rail means provided at the opposite sides of the running track means, said power feeding means including three power feed lines located above one of said guide rail means for receiving supply of electric power, said power feed lines being vertically spaced from the other with an intermediate one being transversely inwardly shifted with respect to the other feed lines, collector shoes provided on the vehicle for respectively cooperating with the power feed lines, at least the collector shoe cooperating with the intermediate feed line being offset with respect to the other collector shoes in longitudinal direction of the vehicle, said collector shoes being located so that they lie in tangential planes of an imaginary cylinder and being of such lengths that they are maintained in contact with the cooperating power feed lines when there is an ordinary angle of rolling movement of the vehicle, insulative shoes respectively associated with the collector shoes and coplanar with the associated collector shoes, said insulative shoes being of such lengths that they are maintained in contact with cooperating power feed lines even when there is an abnormally large rolling of the vehicle.

2. Electric power feeding means in accordance with claim 1 in which each associated collector and insulative shoes are mounted through a pantographic linkage on a base plate which is common to all of the shoes.

3. Electric power feeding means in accordance with claim 1 in which the shoes cooperating with the intermediate one of the power feed lines extend in a vertical plane, the shoes cooperating with an upper one of the power feed lines being inclined with respect to the vertical plane with a lower end inwardly offset toward the other of the pair of guide rails and the remaining shoes being inclined in the opposite direction.

4. Electric power feeding means in accordance with claim 1 in which said guide rail means includes guide surfaces comprised of grounded electrically conductive material and the vehicle is provided with grounding shoe means which is adapted to be maintained in contact with the guide surfaces.

5. Electric power feeding means in accordance with claim 4 in which said grounding shoe means is in the form of a resilient strip which is brought into positive contact with the guide surface under it own resiliency.

6. Electric power feeding means in accordance with claim 5 in which each associated collector and insulative shoe are mounted through a pantograhic linkage on a base plate which is common to all of the shoes, said resilient strip being also mounted on the base plate.

* * * * *